Oct. 24, 1950  H. JEANNERET  2,526,620
ESCAPEMENT
Filed June 15, 1949

INVENTOR.
HENRI JEANNERET
BY
ATTORNEY.

Patented Oct. 24, 1950

2,526,620

UNITED STATES PATENT OFFICE 2,526,620

ESCAPEMENT

Henri Jeanneret, La Chaux-de-Fonds,
Switzerland

Application June 15, 1949, Serial No. 99,157
In Switzerland June 30, 1948

7 Claims. (Cl. 185—46)

1

This invention relates to escapements comprising a driver arranged eccentrically to the axis of rotation of its drive means, and a movable part with an opening having two shoulders and two locking faces concentrical to the axis of rotation of the movable part, the driver alternately exerting a pressure on the shoulders to impart impulses to the movable part alternately in opposite directions.

Up till now, lever escapements have not been used in certain slow-acting relays in that they have been too expensive and too sensitive. Therefore, air-braked flywheels, centrifugal brakes or oscillating anchors controlling the speed of ratchet wheels have been substituted for lever escapements. However, on using such devices, the speed of the gear train alters with the motive force, which is very disadvantageous.

These inconveniences are remedied in an escapement referred to above, if the movable part is a disk.

Figure 1:
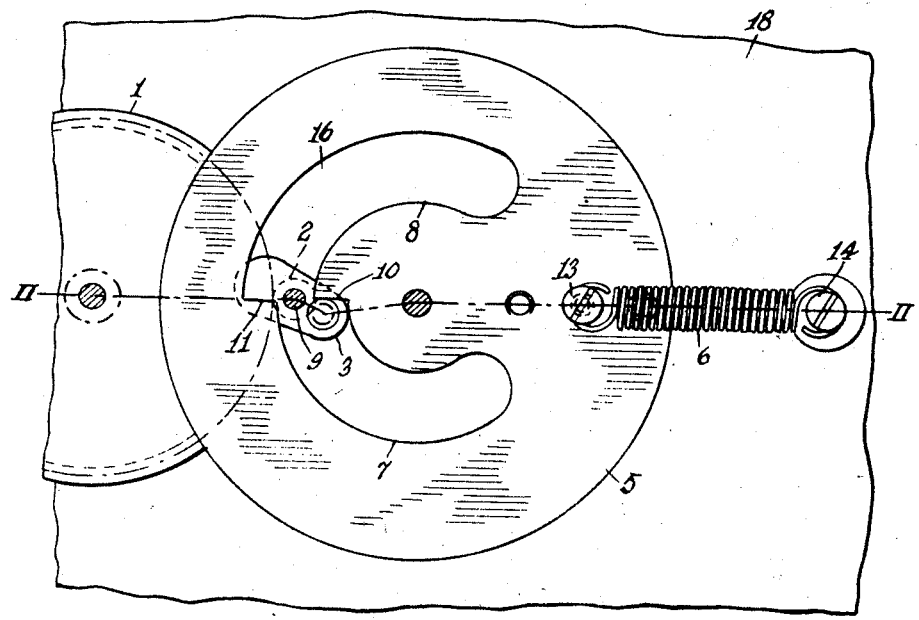
Figure 2:
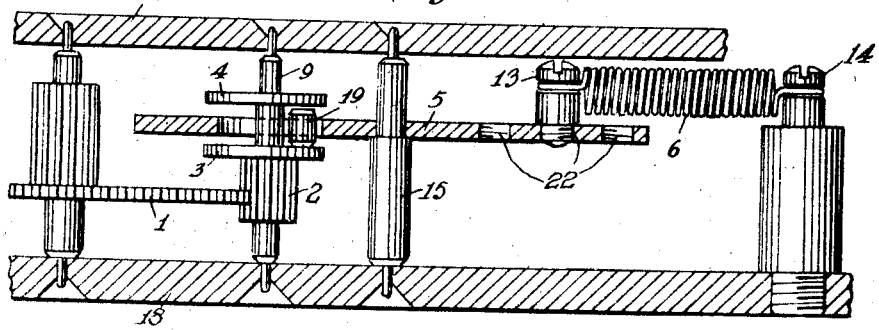
Figure 3:
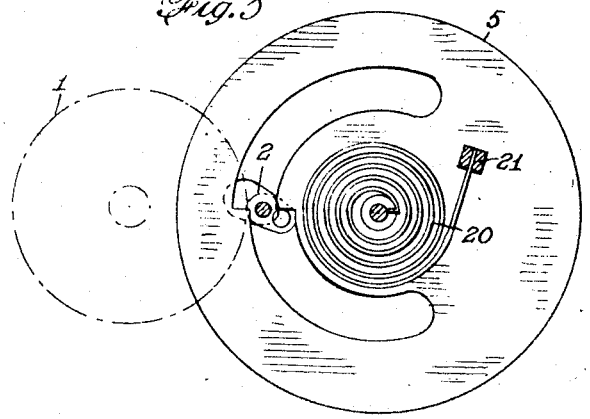

Other objects and features will be apparent as the following description proceeds, reference being had to the accompanying drawings illustrating by way of example two embodiments of my invention, and wherein Fig. 1 is a plan view of the first example,
Fig. 2 is a section along the line II—II in Fig. 1,
Fig. 3 is a plan view of the second example.

The escapement shown in Figs. 1 and 2 is designed for very rapid oscillations of the movable part which here constitutes a balance. A toothed wheel 1 connected with a barrel or any other power source through the intermediary of wheels not shown, meshes with a pinion 2 mounted on an axle 9 carrying two parallel plates 3 and 4. A driver in the shape of a roller 19 is rotatably and loosely mounted on these plates eccentrically to the axle 9. The balance 5 is a circular disk and has an opening 16 of special shape with two shoulders 10 and 11 and two locking faces 7 and 8 concentrical to the axis of rotation 15 of the balance 5, each of these faces forming a corner with one of the shoulders. A helical return spring 6 is anchored on a pin 13 of the balance 5 and fixed to a stationary part by means of a pin 14. The distance between the axis 15 and the axis of the pin 13 may be adjusted to vary the tension of the spring 6. For this purpose, three or more holes 22 are pierced in the balance 5 along a radius of the latter, and the pin 13 may be screwed into either of these holes. Instead of it, pin 14 may be arranged adjustably in a similar manner along a radius of the balance.

The wheel 1, other wheels not shown of the gear

2 train, the pinion 2 and the balance 5 are supported on the plate 18 and on a bridge 17.

The above described escapement works as follows: Let it be presumed that the toothed wheel 1 seen in Fig. 1 rotates in the clockwise direction, and drives the pinion 2 in anticlockwise direction. The pinion 2 operates the balance 5 in that it presses the roller 19 against the shoulder 10 of the opening 16. When the roller 19, in this manner, has imparted a first impulse to the balance 5, the latter rotates in the clockwise direction, while the roller 19 engages the locking surface 7 of the opening 16. As soon as the balance 5 has again reached its median or equilibrium position under the constraint of the spring 6, the roller 19 is pressed against the shoulder 11 of the opening 16, and another impulse is imparted to the balance to continue its rotation in the anticlockwise direction. The roller 19 now engages the locking surface 8 of the opening 16 until the balance has again returned into the median or equilibrium position. Thereafter, the roller 19 is pressed against the shoulder 10 to impart a further impulse to the balance, and a new cycle begins.

The amplitude of the balance oscillations increases with an increasing motive force, but the speed of the gear train remains unchanged. By tightening the spring 6 more or less, the period of oscillation of the balance 5 can be altered, reduced to one half for instance.

The embodiment of Fig. 3 differs from the former in that the helical spring 6 of Fig. 1 is replaced by a spiral or hairspring 20 fixed to a stud 21 of a fixed part. This spiral spring engages the balance 5 in the center of the latter in a manner well-known in the art. The embodiment of Fig. 3 is especially suited for greater periods of oscillations and greater precision.

The choice of a disk as a movable part offers important advantages, and escapements of the kind referred to are indeed only useful on condition that such a disk is used.

Some of these advantages are as follows:

The disk allows a compact design to be obtained so that the escapements provided therewith can be used in portable apparatus. The disk can be equilibrated, i. e., it may rotate around an axis going through its centre of gravity so that timing in positions becomes possible. By a suitable choice of the opening 16, great oscillations may be obtained, the amplitudes of which may even exceed 90° on either side of the median or equilibrium position. This is a particular advantage, for, as is well-known, a balance of a great amplitude of oscillation easily ensures isochronism. On using a disk as a movable part, the distance between the axes of the parts 9 and 15 is very small, so that each impulse imparts a great acceleration to the disk. Furthermore, the moment of inertia of a disk is relatively small so that it may easily perform rapid oscillations.

The rotatable driver, such as the roller 19 offers the advantage of having rolling friction instead of sliding friction, the former being considerably smaller than the latter. The diameter of the roller may be made fairly large to obtain a reduction of the circumferential velocity and of the rolling friction of the driver. Supporting the roller between two bearings instead of arranging it in overhung position prevents detrimental deformation of the roller axle and enables small diameters to be given to the pivots.

The use of a spring does not only allow the return force to be altered but to be chosen as great as desirable for obtaining rapid oscillations and isochronism. This great return force makes the escapement self-starting.

While I have shown and described two embodiments of my invention, I wish it to be understood that I do not desire to be limited to the details thereof as various modifications may occur to a person skilled in the art.

What I claim is:

1. In an escapement, a fixed part, an oscillating disk rotatably mounted on said fixed part, a return spring fixed to said fixed part and to said disk to return the latter into its equilibrium position, said disk comprising an opening with borders forming two locking faces concentrical to the axis of rotation of said disk, and two shoulders, a drive means, a rotatable driven means engaged by said drive means and supported on said fixed part, a support coupled with said driven means, a driver entering said opening and mounted on said support eccentrically to the axis of rotation of said driven means to engage alternately one of said shoulders for imparting an impulse to said disk against the constraint of said return spring, and to engage alternately one of said locking faces for preventing rotation of said driven means.

2. In an escapement, a fixed part, a circular oscillating disk rotatably mounted on said fixed part, a return spring fixed to said fixed part and to said circular disc to return the latter into its equilibrium position, said disk comprising an opening with borders forming, two locking faces concentrical to the axis of rotation of said disk, and two shoulders forming corners together with said locking faces, a gear wheel, a pinion meshing with said gear wheel and being supported on said fixed part, a support rigidly connected with said pinion, a driver entering said opening and mounted on said support eccentrically to the axis of rotation of said pinion to engage alternately one of said shoulders for imparting an impulse to said disk against the constraint of said spring, and to engage alternately one of said locking faces for preventing rotation of said pinion.

3. In an escapement, a fixed part, a circular oscillating disk rotatably mounted on said fixed part, a return spring fixed to said fixed part and to said circular disc to return the latter into its equilibrium position, said disk comprising an opening with borders forming, two locking faces concentrical to the axis of rotation of said disk, and two shoulders forming corners together with said locking faces, a gear wheel, a pinion meshing with said gear wheel and being supported on said fixed part, a support rigidly connected with said pinion, a roller entering said opening and rotatably mounted on said support eccentrically to the axis of rotation of said pinion to engage alternately one of said shoulders for imparting an impulse to said disk against the constraint of said spring, and to engage alternately one of said locking faces for preventing rotation of said pinion.

4. In an escapement, a fixed part, a circular oscillating disk rotatably mounted on said fixed part around an axis going through the center of gravity of the disk, a return spring fixed to said fixed part and to said circular disk to return the latter into its equilibrium position, said disk comprising an opening with borders forming, two locking faces concentrical to the axis of rotation of said disk, and two shoulders forming corners together with said locking faces, a gear wheel, a pinion meshing with said gear wheel and having an axle traversing said opening and being supported on said fixed part on either side of said disk, two plates fixed to said axle on opposite sides of said disk, a driver traversing said opening and mounted on said plates eccentrically to the axis of rotation of said pinion to engage alternately one of said shoulders for imparting an impulse to said disk against the constraint of said return spring, and to engage alternately one of said locking faces for preventing rotation of said pinion on return of said disk to its equilibrium position under the constraint of said return spring.

5. In an escapement, a fixed part, a circular oscillating disk rotatably mounted on said fixed part around an axis going through the center of gravity of the disk, a return spring fixed to said fixed part and to said circular disk to return the latter into its equilibrium position, said disk comprising an opening with borders forming, two locking faces concentrical to the axis of rotation of said disk, and two shoulders forming corners together with said locking faces, a gear wheel, a pinion meshing with said gear wheel and having an axle traversing said opening and being supported on said fixed part on either side of said disk, two plates fixed to said axle, on opposite sides of said disk, a roller traversing said opening and rotatably mounted on said plates eccentrically to the axis of rotation of said pinion, to engage alternately one of said shoulders for imparting an impulse to said disk against the constraint of said spring, and to engage alternately one of said locking faces for preventing rotation of said pinion on return of said disk to its equilibrium position under the constraint of said return spring.

6. In an escapement, a fixed part, a circular oscillating disk rotatably mounted on said fixed part around an axis going through the center of gravity of the disk, a spiral return spring fixed to said fixed part and engaging said disk in its axis of rotation, to return said disk into its equilibrium position, said disk comprising an opening with borders forming, two locking faces concentrical to the axis of rotation of said disk, and two shoulders forming corners together with said locking faces, a gear wheel, a pinion meshing with said gear wheel and having an axle traversing said opening and being supported on said fixed part on either side of said disk, two plates fixed to said axle on opposite sides of said disk, a roller traversing said opening and rotatably mounted on said plates eccentrically to the axis of rotation of said pinion, to engage alternately one of said shoulders for imparting an impulse to said disk against the constraint of said spring, and to engage alternately one of said locking faces for preventing rotation of said pinion on return of said disk to its equilibrium position under the constraint of said spiral return spring.

7. In an escapement, a fixed part, a circular oscillating disk rotatably mounted on said fixed part around an axis going through the center of gravity of the disk, an adjustable helical return spring fixed to said fixed part and to said circular disk outside the axis of rotation of the latter with its longitudinal axis coinciding in rest position of the disk with the median line of the oscillation of the disk arranged to return said disk into its equilibrium position, said disk comprising an opening with borders forming, two locking faces concentrical to the axis of rotation of said disk, and two shoulders forming corners together with said locking faces, a gear wheel, a pinion meshing with said gear wheel and having an axle traversing said opening and being supported on said fixed part on either side of said disk, two plates fixed to said axle on opposite sides of said disk, a roller traversing said opening and rotatably mounted on said plates eccentrically to the axis of rotation of said pinion to engage alternately one of said shoulders for imparting an impulse to said disk against the constraint of said spring, and to engage alternately one of said locking faces for preventing rotation of said pinion on return of said disk to its equilibrium position under the constraint of said helical return spring.

HENRI JEANNERET.

No references cited.